INVENTOR.
John A. Wereb Jr.

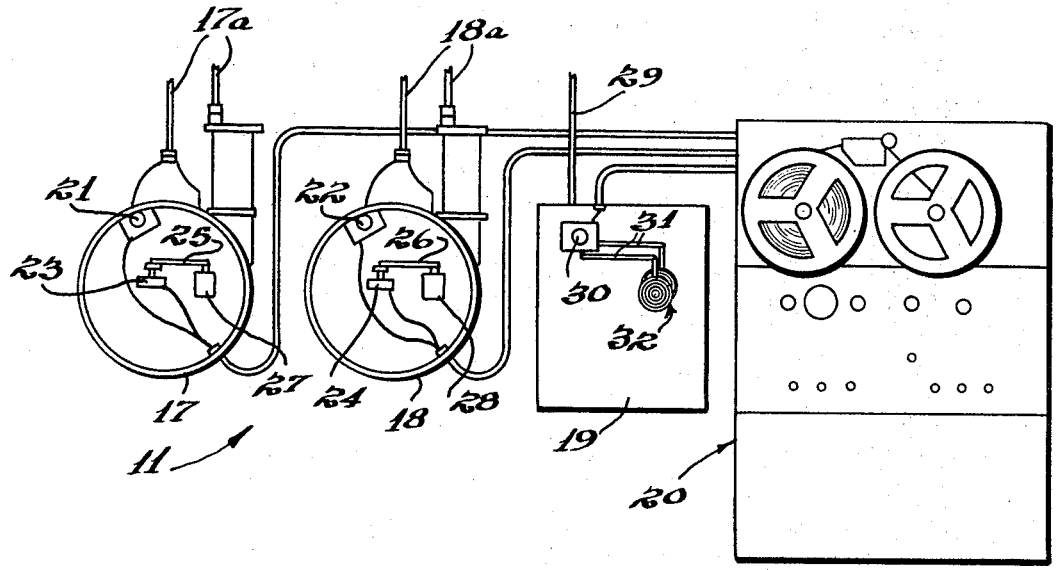
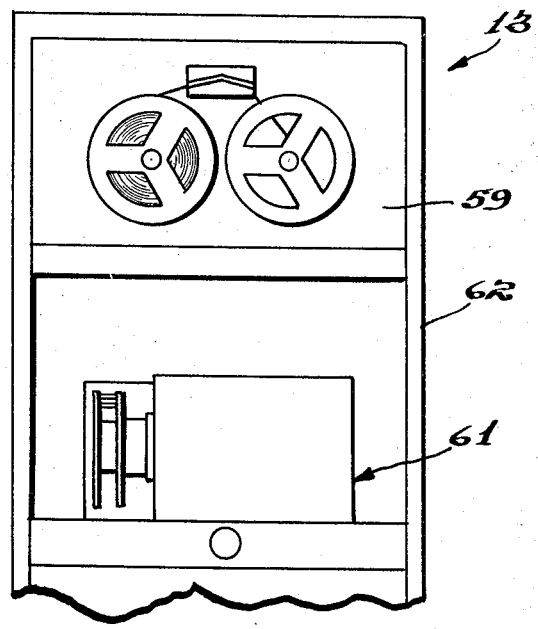

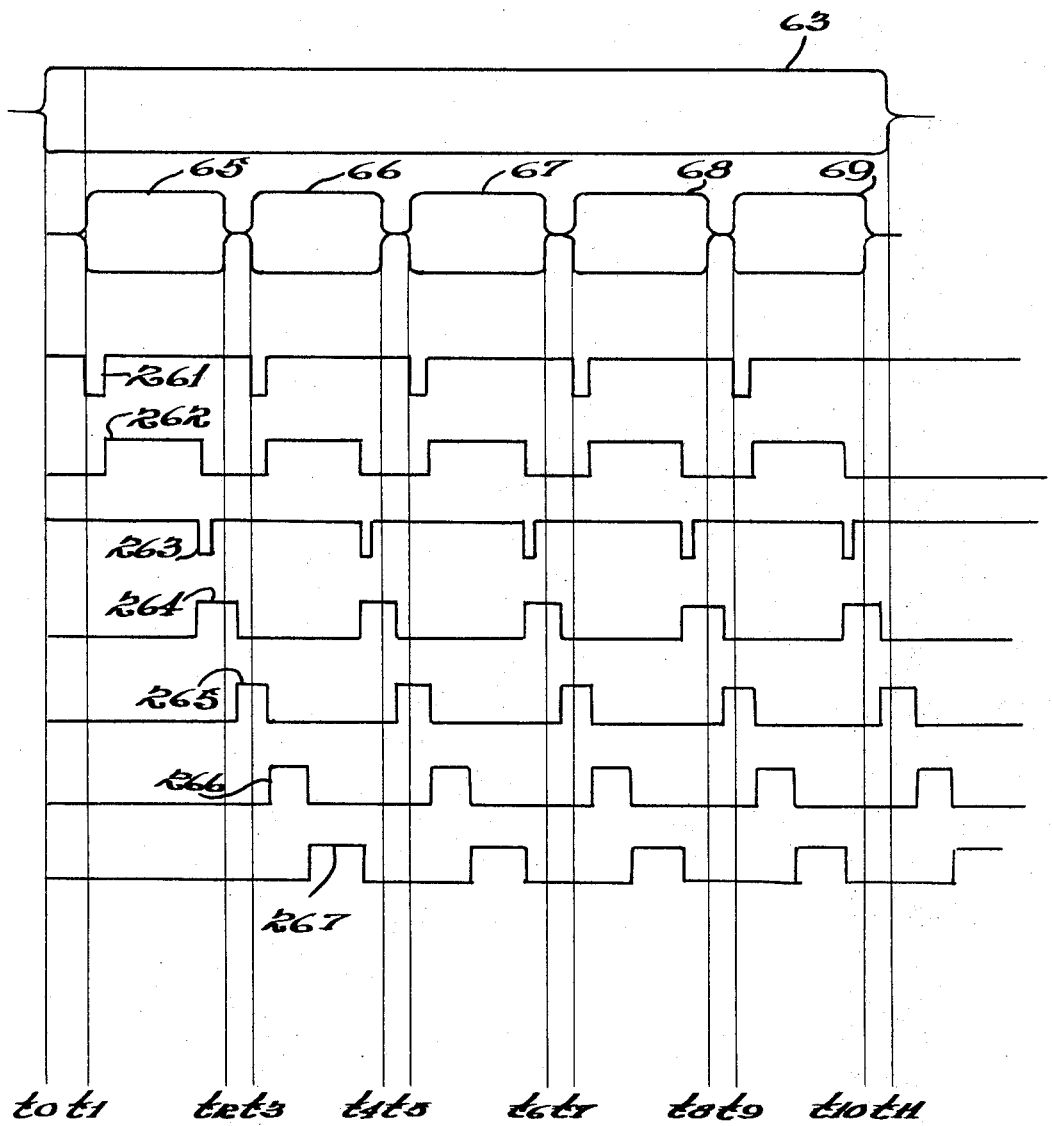

BY

ATTORNEYS

3,521,259
ERROR CORRECTION UTILIZING PLURAL
COUNTERS
John A. Wereb, Jr., Lyndhurst, Ohio, assignor to TRW
Inc., a corporation of Ohio
Continuation of application Ser. No. 287,868, June 14,
1963. This application Nov. 21, 1966, Ser. No. 602,443
Int. Cl. G11b 5/04, 5/44
U.S. Cl. 340—174.1                                    3 Claims

ABSTRACT OF THE DISCLOSURE

A data transcribing system having means for developing a data burst having a frequency which corresponds to desired information. A fixed frequency is applied to a magnetic tape along with the data burst frequency and a pair of counters are used to count the two signals. One of the counters has means associated therewith for controlling the operation of the second counter after a given count is obtained. In this way the frequency of the data burst signal can be determined with a high degree of accuracy and independently of the speed of movement of the magnetic tape during recording and playback.

---

This application is a continuation of my co-pending patent application, Ser. No. 287,868, now abandoned.

This invention relates to a data recording and processing system developed with the general object of providing a system capable of receiving a large amount of data in analog form, recording such data over a long period of time, and subsequently rapidly reproducing such data with a read-out of the data in digital form, operative with a high degree of accuracy and reliability while using minimum power, a minimum amount of recording medium and a minimum number of expensive components and while being comparatively simple and trouble-free in operation.

The system was particularly designed for the measurement and recording of gas flow parameters in conjunction with natural gas pipe lines or the like and the automatic processing of recorded data for preparation of customer's billings and other information therefrom. In general, the system comprises a field station which automatically records data on magnetic tape, including differential and static pressure signals, temperature and specific gravity signals and time, identification and other information signals of various types. Tape rolls from such field stations are periodically collected and are supplied to a transcriber unit at a central location, the transcriber unit being operated at a relatively high rate of speed to translate and convert the magnetically recorded information into digital information recorded on punched tape. The punched tape in turn is supplied to a computer which develops billing, flow data and other information. It will be appreciated, of course, that various features of the invention may be applied to other types of systems.

A highly important feature of the invention is in the recording of the data on the magnetic tape in the form of a variable frequency signal, the frequency being a function of the magnitude of a analog data signal, and in the simultaneous recording of a reference signal of constant frequency on a second track of the magnetic tape, such signals when reproduced being compared to develop an output signal independent of variations in the speed of movement of the tape during recording and reproducing, and independent of other variables. With this feature, an extremely high degree of accuracy is obtained with comparatively simple and inexpensive recording and reproducing equipment, and a low recording speed may be used, making possible the recording of a large amount of information on a single roll of tape.

Further important features of the invention relate to the use of a counter in the transcriber unit operative to count the number of cycles in the reproduced data signal during a certain time interval, to thereby develop a digital signal. Preferably, the counter comprises a plurality of decade stages in cascade with information being transferred therefrom in a binary decimal code, an 8, 4, 2, 1 code being preferred. The data counting time interval is preferably controlled by a reference counter which counts a predetermined number of cycles of the reproduced reference signal. With this feature, a digital read-out is obtained with an extremely high degree of accuracy.

Another very important feature of the invention relates to the provision of means in the field station for applying data voltages to a voltage-controlled oscillator in a predetermined sequence to develop corresponding frequency bursts which are recorded. A series of such bursts form a message and the reference signal may be used to indicate the beginning and end of such a message, by starting with the first data frequency burst of the message and ending with the last data frequency burst of the message. This feature is also important in that the recording equipment can be operated intermittently, at four minute intervals for example, to obtain an extremely low average recording rate.

Other important features of the invention relate to the recording, detection and separation of information in the form af various types of messages, and to particular circuit arrangements operative to provide highly reliable and accurate operation.

These and other objects, features and advantages of the invention will become more fully apparent from the following detailed description taken in conjunction with the accompanying drawings which illustrate a preferred embodiment and in which:

FIG. 2 illustrates the physical form of a field station portion of the system of FIG 1;

FIG. 3 illustrates the physical form of portions of the transcribing station of the system of FIG. 1;

FIG. 4 illustrates wave forms produced at various points of the system;

Figure 1:
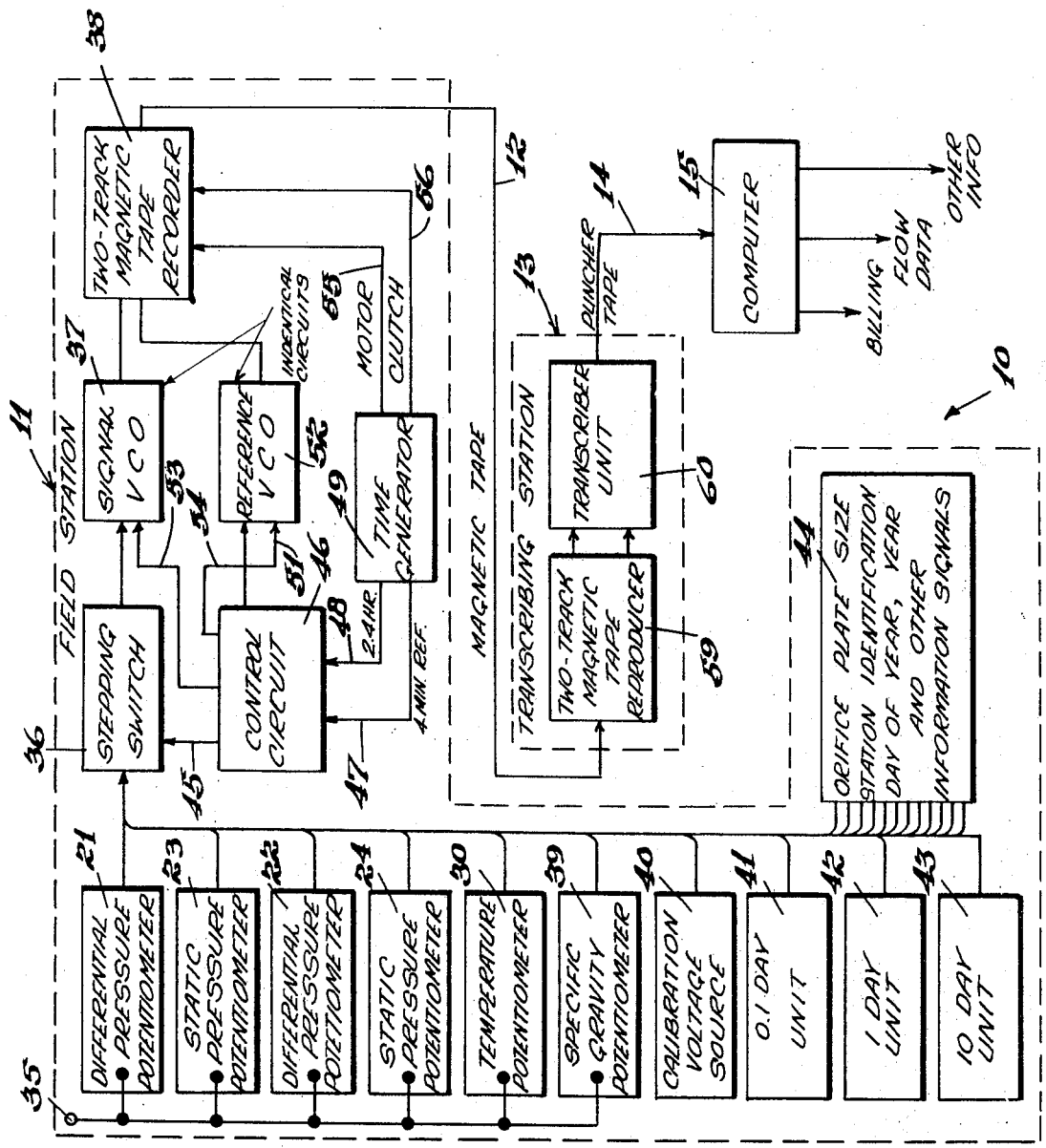
FIG. 1 is a block diagram of a data recording and processing system constructed according to the principles of this invention.

The illustrated data recording and processing system, generally designated by reference numeral 10, was particularly designed for the measurement and recording of gas flow parameters in natural gas pipe lines or the like and the automatic processing of recorded data for preparation of customer billings and other information therefrom. The system greatly reduces operating costs, and is reasonably inexpensive in construction while being very accurate, rugged and reliable. In addition, it is very versatile and can be readily expanded to record and process any desired form of data. It will be appreciated that the system and the various features thereof have a wide variety of applications.

In brief, the illustrated system 10 comprises a field station 11 which automatically records data on magnetic tape 12 driven only a small percentage of the time to obtain a very low average rate such that, for example, one 7 inch roll of tape may record data for an entire month or more. Tape rolls from the field station 11 and tape rolls from other field stations are periodically collected (at intervals of once a month from each station, for example) and are supplied to a transcriber unit 13 which is operated at a relatively high rate of speed and translates and converts the magnetically recorded information into digital information recorded on punched tape 14. The punched tape 14 in turn is fed to a computer 15 which develops billing, flow data and other information.

FIG. 2 shows the physical form of the field station 11 which includes a pair of orifice flow meters 17 and 18, a temperature meter 19 and a magnetic recording and electronic circuit unit 20. The orifice flow meters 17 and 18 are similar to conventional recording type flow meters but have potentiometers in place of the conventional recording pens. In particular, the flow meters 17 and 18 include pairs of lines 17a and 18a connected to gas flow pipes (not shown) on opposite sides of orifice plates therein, a pair of precision potentiometers 21 and 22 mechanically coupled to shafts which are rotated in proportion to differential pressures and a pair of precision potentiometers 23 and 24 which are connected through linkages 25 and 26 to units 27 and 28 which respond to static pressures. The temperature meter 19 comprises a connecting line 29 and a potentiometer 30 connected through linkages 31 to a temperature responsive unit 32.

In brief, the operation of the field station 11 is such that various information signals developed by the potentiometers and other sources are converted to a series of data frequency bursts to form a message which is recorded on one track of the magnetic tape 12 while a reference signal is recorded on the second track. In particular, as shown diagrammatically in FIG. 1, the potentiometers 21–24 and 30 are connected to a terminal 35 to which a fixed D.C. voltage is applied and also connected through a stepping switch 36 to a signal voltage-controlled oscillator 37 the output of which is connected to one input of a two track magnetic tape recorded 38. The stepping switch 36 is additionally connected to a specific gravity potentiometer 39, a calibration voltage source 40, a 0.1 day time signal generator unit 42, a 1 day time signal generator unit 42, a 10 day time signal generator unit 43 and a unit 44 operative to supply orifice plate size, station identification, day of year, year and other information signals.

The stepping switch 36 is controlled through a line 45 by a control circuit 46 which in turn is controlled through lines 47 and 48 from a time generator 49. The control circuit applies a reference signal on a line 57 connected to a second voltage-controlled oscillator 52 the output of which is applied to the second input of the two track magnetic tape recorder 38. The control circuit 46 additionally supplies blanking signals to the signal and reference voltage-controlled oscillators 37 and 52 through lines 53 and 54. In addition, a pair of lines 55 and 56 extend from the time generator 49 to the recorder 38 to actuate the motor and clutch of the recorder 38.

In operation, the various information signals developed by the potentiometers and other sources are converted to a series of data frequency bursts to form a message which is recorded on one track of the magnetic tape 12 while a reference signal is recorded on the second track. A plurality of types of such messages, containing differing data information, may be recorded, three different types being recorded in the illustrated system, designated as Type I, Type II and Type III messages.

The Type I message is generated at four minute intervals and has five data frequency bursts corresponding to the differential pressure signal from potentiometer 21, the static pressure signal from potentiometer 23, the differential pressure signal from potentiometer 22, the static pressure signal from potentiometer 24, and the temperature signal from potentiometer 30.

The Type II message is generated at 2.4 hour intervals and has the same five data frequency bursts as the Type I message and additionally has data bursts corresponding to a specific gravity signal from potentiometer 39, a calibration signal from source 40, a 0.1 day time signal from unit 41, a 1 day time signal from unit 42 and a 10 day time signal from unit 43.

The Type III message is transmitted at the beginning and end of a tape roll and has the same data frequency bursts as the Type II message and additionally has data frequency bursts corresponding to orifice plate size, station identification, day of year, year and other information signal supplied by the unit 44.

The roll of magnetic tape from the field station 11, containing data collected over a month or more, is taken to a central office where it is inserted in the transcriber station 13 which includes a two track magnetic tape reproducer 59 and a transcriber unit 60, including a tape punch 61, the reproducer 59, the tape punch 61 and circuits of the unit 60 being mounted within a suitable cabinet 62 as illustrated in FIG. 3.

In transmitting a Type I message, for example, the time generator 49 initially supplies a signal on line 55 to energize the motor of the recorder 38 and then applies a signal on a line 56 to actuate the capstan solenoid thereof. At the same time, a signal is applied on line 47 to the control circuit 46. Thereafter, at a time $t_0$ as illustrated in FIG. 4, the control circuit 46 removes a blanking signal from the line 54 to cause operation of the reference voltage-controlled oscillator 52 and to record on one track of the magnetic tape a pulse signal having a frequency of approximately 1164 cycles per second, for example, and having an envelope of a form as indicated by reference numeral 63 in FIG. 4.

Thereafter, at a time $t_1$, the control circuit 46 removes a blanking signal from the signal voltage-controlled oscillator 37 while the input of the voltage-controlled oscillator 37 is connected through the stepping switch 36 to the output of the differential pressure potentiometer 21. A data frequency burst is then recorded on the magnetic tape having an envelope as indicated by reference numeral 65 in FIG. 4. This burst continues until a time $t_2$, when a blanking signal is again applied on the line 53. The data frequency burst may, for example, have a duration of 280 milliseconds and a frequency on the order of from 453 to 1818 cycles per second, depending upon the voltage developed by the differential pressure potentiometer 21.

After the first data frequency burst 65, a signal is applied on line 45 to the stepping switch 36 to connect the input of the signal voltage-controlled oscillator 37 to the output of the static pressure potentiometer 23. Thereafter, at a time $t_3$, control circuit 46 removes the blanking signal on line 53 and the signal voltage-controlled oscillator 37 generates a second frequency burst 66 which continues until a time $t_4$. In a similar manner, data frequency bursts 67, 68 and 69 are generated from times $t_5$–$t_6$, $t_7$–$t_8$ and $t_9$–$t_{10}$ at frequencies corresponding to the voltages developed by the potentiometers 22, 24 and 30. At a time $t_{11}$ following the end of the last data burst 69, the control circuit 46 again applies a blanking signal to the reference voltage-controlled oscillator 52 and thereafter the time generator 49 removes signals from the lines 55 and 56 to deenergize the motor and clutch of the tape recorder 38.

The Type II and Type III messages are generated in the same way, except in having longer durations and more data bursts corresponding to the additional types of information.

Figure 5:
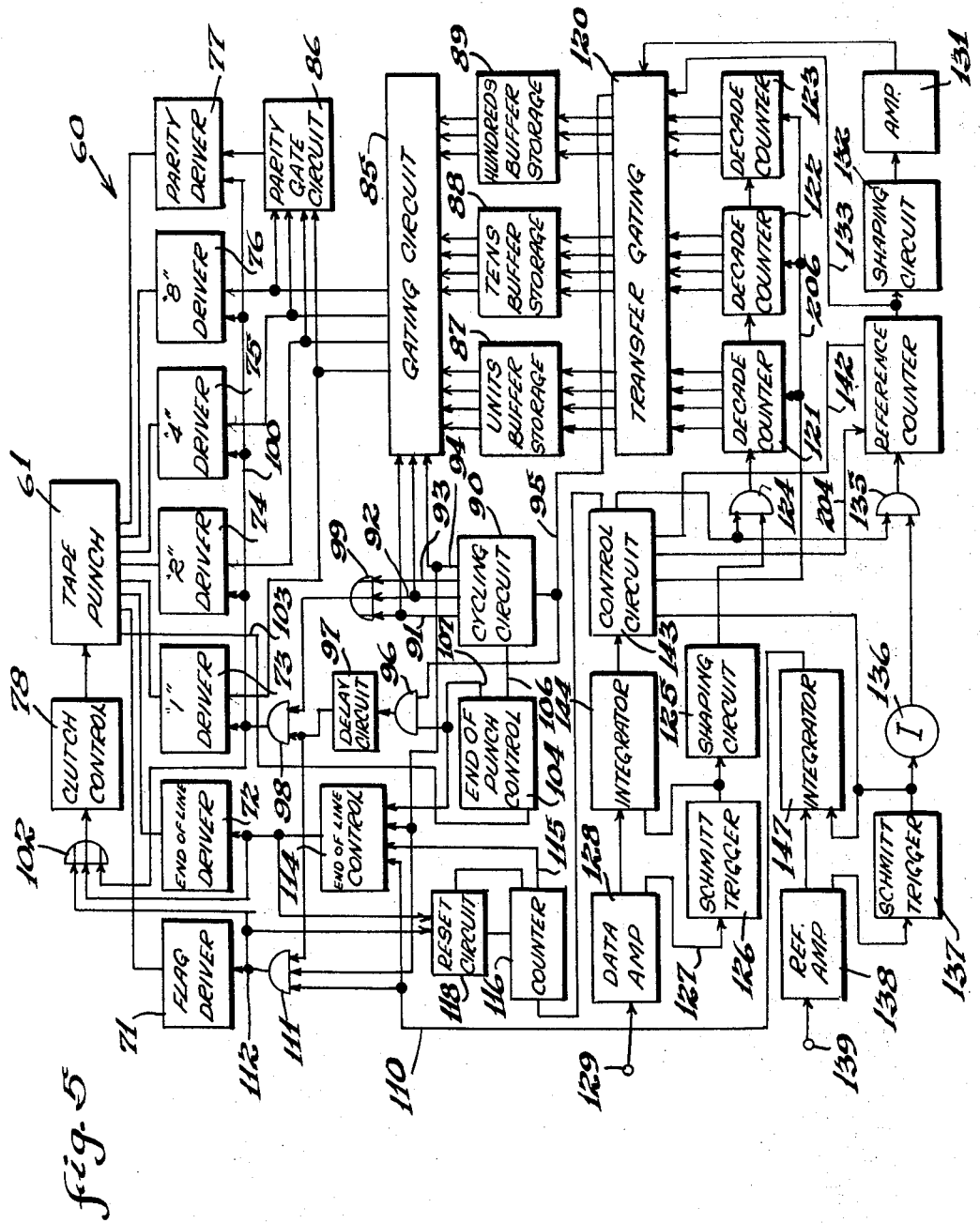
FIG. 5 is a schematic block diagram of the transcribing station portion of the system.

Referring now to FIG. 5, the tape punch 61 operates to punch tape in accordance with signals on the magnetic tape supplied to the reproducer 59, a section or block of tape being punched in response to each message. The tape punch 61 by itself is of conventional construction and includes punches operated by solenoids which are energized by driver circuits 71–77, and also includes a clutch operated from a clutch control circuit 78. The drivers 71 and 72 are referred to as "flag" and "end of line" drivers, the drivers 73—76 are referred to as "1," "2," "4" and "8" digit or code punch drivers and the driver 77 is a parity driver.

As a specific example, assume that the differential pressure signal from the potentiometer 21 in the field station is such that 369 signal pulses are developed by the voltage-controlled oscillator 37 within a first data frequency burst 65 of a Type I message, during the generation of 256 reference pulses by the voltage-controlled oscillator 52. Such signal pulses when reproduced are counted in the transcribing circuit and the "1" and "2" drivers 73 and 74 are simultaneously energized to punch holes at certain locations of the paper tape, indicating the "hundreds" digit of 3, the parity driver 77 being also energized simultaneously to punch a hole at a certain location. Thereafter, the clutch control 78 is energized to move the paper tape through a certain distance, and the "2" and "4" drivers 74 and 75 are energized to punch holes indicating the "tens" digit of 6. After again energizing the clutch control 78, the "1" and "8" drivers 73 and 76 are energized to punch holes indicating the "units" digit of 9. Thereafter, in a Type I message, four additional groups of holes are punched with three sets of holes in each group corresponding to the digits of the transcribed data bursts 66–69. Flag designation holes are then punched, indicating the end of the Type I message.

The operation is the same with the Type II and Type III messages except in the punching of an additional group of holes for each additional data frequency burst. End of line designation holes are punched following the Type II and Type III messages.

The inputs of the "1," "2," "4" and "8" drivers 73–76 are connected through lines 81–84 to outputs of a gating circuit 85 and also to inputs of a parity gate circuit 86 having an output connected to the parity driver 77. The gating circuit 85 has a group of four input lines connected to a units buffer storage circuit 87, another group of four input lines connected to a tens buffer storage circuit 88 and a group of three input lines connected to a hundreds buffer storage circuit 89, the number of counts occurring in a particular data frequency burst during the generating of 256 reference pulses being digitally stored in the circuits 87–89.

The gating circut 85 is controlled from a cycling circuit 90 having four output lines 91–94 energized in sequence.

In operation, after seting the storage circuits 87–89 in accordance with the number of pulses occurring in a data frequeny burst during a certain number (256) of reference pulses, a pulse is applied on a line 95 to place the cycling circuit 90 in a reset condition in which the line 91 is energized with the lines 92, 93 and 94 being deenergized. The signal on the line 95 is applied through and AND gate 96 and through a delay circuit 97 to another AND gate 98 having a second input connected through an OR gate 99 to the lines 91–93. The pulse on the line 95 is thus applied on an output line 100 of the gate 98 which is connected to the drivers 73–77 to operate the punches in accordance with the information in the hundreds buffer storage 89. The signal on the line 100 is also applied through an OR gate 102 to the clutch control 78 which then operates to advance the paper tape following the punching operation. A signal is then applied from a cam-operated switch in the tape punch 61 and through a line 103 to an end of punch shift circuit 104 which applies a shift signal to the cycling circuit 90 on a line 106. It may be noted that the end of punch shift circuit 104 has a second output 107 connected to the AND gate 96 and operative to close the gate 96 during the punching and shifting operation.

When the shift signal is applied through the line 106 to the cycling circuit 90, the line 92 is energized while the lines 91, 93 and 94 are deenergized. A signal is then applied through the gates 99 and 98 to the line 100 to cause operation of the drivers 73–77 in accordance with the information in the tens buffer storage 88. Thereafter, a signal is applied through the line 103 and the end of punch shift circuit 104 to the cycling circuit 90 to again shift the circuit, energizing the line 93 and deenergizing the other lines. The drivers 73–77 are then energized in accordance with the information in units buffer storage 87, and another signal is applied from the tape punch 61 through the line 103 and the circuit 104 to shift the cycling circuit 90 to energize the line 94 and deenergize the line 91–93.

If when the line 94 is energized, a reference signal envelope is present to indicate that information in another data burst is being counted, the cycling circuit 90 remains in that condition until another pulse is developed on the line 95 following the transfer of information to the storage circuits 87–89. The cycling circuit 90 is then placed in its initial or reset condition with the line 91 being energized and the lines 92–94 being deenergized, and the circuit automatically goes through another cycle in the same manner as described above.

If, however, with the line 94 energized there is no reference envelope, a signal is developed on a line 110 of such polarity as to enable a gate 111 having another input connected to the line 94 and having an output connected through a line 112 to the flag driver 71, to thereby punch a flag designation on the tape. At the same time, a signal is applied from the line 112 to another input of the OR gate 102 to energize the clutch control 78 and to advance the tape.

The end of line driver 72 is energized from an end of line control circuit 114 when the number of data frequency bursts in a message has been eight or more, thus indicating a Type II or Type III message. The end of line control circuit 114 has inputs connected to lines 94, 107 and 110 and an additional input connected through a line 115 connected to the output of a counter 116 which counts the number of data bursts and develops an output signal on the line 115 when the number of bursts in a message is eight or more. The counter 116 has a second output connected through a line 117 to a reset circuit 118 for the counter 116, the reset circuit 118 having inputs connected to the output of the gate 111 and the output of the end of line control circuit 114.

The units, tens and hundreds buffer storage circuits 87–89 have inputs connected through a transfer gating circuit 120 to decade counters 121–123 connected in cascade. The input of the first counter is connected to the output of a gate 124 having an input connected to the output of a shaping circuit 125 supplied with signals from a Schmitt trigger circuit 126 having an input connected through a line 127 to the output of a data signal amplifier 128 the input of which is connected to an input terminal 129 connected to the output of one of the reproducing heads of the magnetic tape reproducer 59.

The transfer gating circuit 120 is controlled from the output of an amplifier 131 having an input connected through a shaping circuit 132 to an output line 133 from a reference counter circuit 134. Output line 133 is connected to an input of the transfer gating circuit 120 to be connected through a gate thereof to the line 95 when a signal is applied from the amplifier 131 to transfer the information from counters 121–123 to the storage circuits 87–89.

The input of the reference counter circuit 134 is connected to the output of a gate 135 having an input connected through an inverter 136 to the output of another Schmitt trigger circuit 137, the input of the circuit 137 being connected to an output of a reference signal amplifier 138 having an input connected to an input terminal 139 which is connected to the second reproducing head of the two channel magnetic tape reproducer 59.

In the general operation of the circuit, both gates 124 and 135 are enabled by a signal on a line 141 and the decade counters 121–123 count data pulses while the reference counter 134 counts reference pulses. When the reference counter circuit reaches a certain count (256 in the illustrated system), an output is developed on a line 142 to close the gates 124 and 135 in a manner to be described, and thereafter an output is developed on the line 133 which is applied through the shaping circuit 132 and amplifier 131 to the transfer gating circuit 120.

The lines 141 and 142 are connected to a control circuit 143 having one input connected to the output of the Schmitt trigger circuit 137 and a second input connected to the output of an integrator circuit 144 which has one input connected to the output of the data signal amplifier 128 and a second input connected to the output of the Schmitt trigger circuit 126.

The operation of the circuits 143 and 144 is described in detail below. In brief, the integrator circuit 144 produces a signal corresponding to the envelope of the data frequency bursts, but subject to a small noise component. This signal is used to trigger a multivibrator in the control circuit 143 which "waits" for a certain time period and if at that time the input signal is above a predetermined level, an output is developed on the line 141 to enable the gates 124 and 135. If, however, the input signal is not above the predetermined level at the end of the waiting period, indicating that the initial triggering signal was a noise impulse, the circuit is restored to its initial condition and no output signal is developed. This arrangement thus serves as a noise rejection device.

The control circuit 143 also develops a signal in response to each data burst which is applied through a line 146 to the input of the counter 116.

To develop the reference envelope signal on the line 110, an integrator circuit 147 is provided having one input connected to on output of the reference signal amplifier 138 and having a second input connected to the output of the Schmitt trigger circuit 137.

Figure 6:
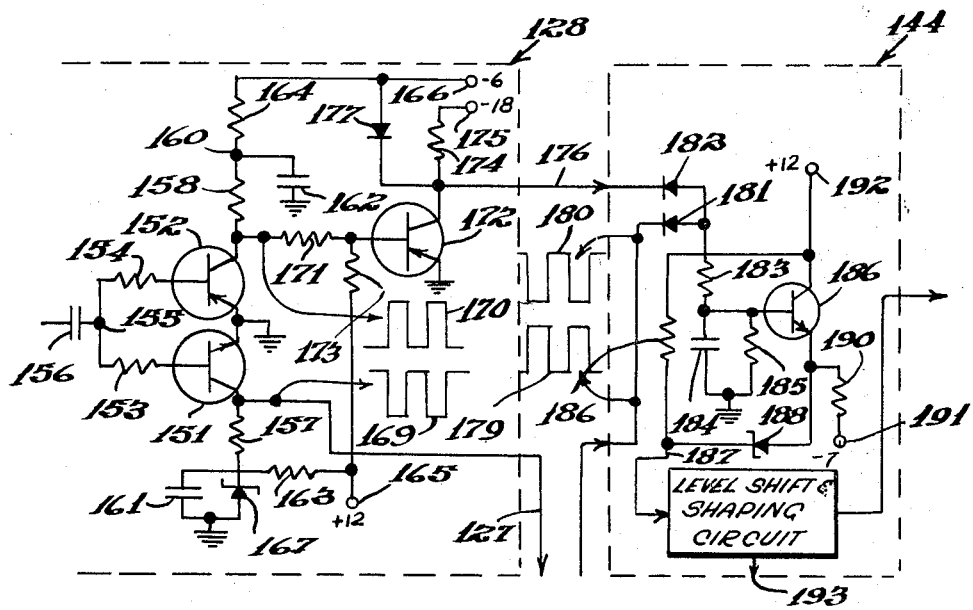
FIG. 6 is a circuit diagram of an integrator and final stages of a data signal amplifier, used in the transcriber station.

FIG. 6 illustrates the circuit of the integrator 144 and final stages of the data signal amplifier 128, the circuit of the integrator 147 and associated final stages of the reference signal amplifier 138 being identical thereto. Such circuits are important in obtaining reliable generation of the data and reference signal envelope signals.

As illustrated, a pair of transistors 151 and 152 of opposite types are provided in the data signal amplifier 128 with the emitters thereof being connected to ground and with the base electrodes thereof connected through resistors 153 and 154 to a circuit 155 connected through a coupling capacitor 156 to the output of a preceding stage in the data signal amplifier 128.

The collectors of the transistors 151 and 152 are connected through resistors 157 and 158 to circuit points 159 and 160 which are connected to ground through capacitors 161 and 162 and through resistors 163 and 164 to power supply terminals 165 and 166. The terminal 165 is at a positive voltage relative to ground, for example 12 volts, and a Zener diode 167 is preferably connected between the circuit point 159 and ground to maintain the circuit point 159 at a regulated value, preferably 6 volts. The power supply terminal 166 is at a negative potential relative to ground, preferably minus 6 volts. Both transistors 151 and 152 are normally non-conductive to place the collectors thereof at positive and negative potentials respectively.

When an AC signal is applied through the coupling capacitor 156, from a preceding stage of the data signal amplifier 128, the transistor 151 conducts during positive half cycles to develop negative pulses at the output thereof, while the transistor 152 conducts during negative half cycles to develop positive pulses at the collector thereof, to thus develop signals having wave forms as indicated by reference numerals 169 and 170 in the drawing.

The signal from the collector of the transistor 151 is applied through line 127 to the input of the Schmitt trigger circuit 126 which develops negative pulses to be applied to one input of the integrator 144.

The collector of the transistor 152 is connected through a resistor to the base of a transistor 172 and also through a bias resistor 173 to the power supply terminal 165. The collector of the transistor 172 is connected through a resistor 174 to a power supply terminal 175 (preferably at a potential of minus 18 volts) and also to an output line 176 connected to a second input of the integrator 144. The collector of the transistor 172 is additionally connected through a diode 177 to the negative power supply terminal 166.

The transistor 172 is normally conductive to place the output line 176 at a potential close to ground potential. When a positive pulse is applied to the base of transistor 172, it is cut off to place the output line at a negative potential which cannot substantially exceed that of the terminal 166, due to the diode 177.

According, negative pulses in out-of-phase relation are applied to the two inputs of the integrator circuit 144, as depicted by wave forms 179 and 180 in the drawing. Such negative pulses are applied through diodes 181 and 182 and through a resistor 183 to a capacitor 184 shunted by a resistor 185 and connected to the base of a transistor 186. The capacitor 184 is rapidly charged to a negative value and is maintained charged as long as the data signal envelope is present. A negative signal is developed at a circuit point 187 connected through a Zener diode 188 to the emitter of transistor 186 and also through a resistor 189 to the collector of the transistor 186, the emitter being connected through a resistor 190 to a negative power supply terminal 191 and the collector being connected directly to a positive power supply terminal 192. The negative signal at circuit point 187 is applied to the input of a level shifting and sharpening circuit 193, the output of which is applied to the control circuit 143.

Figure 7:
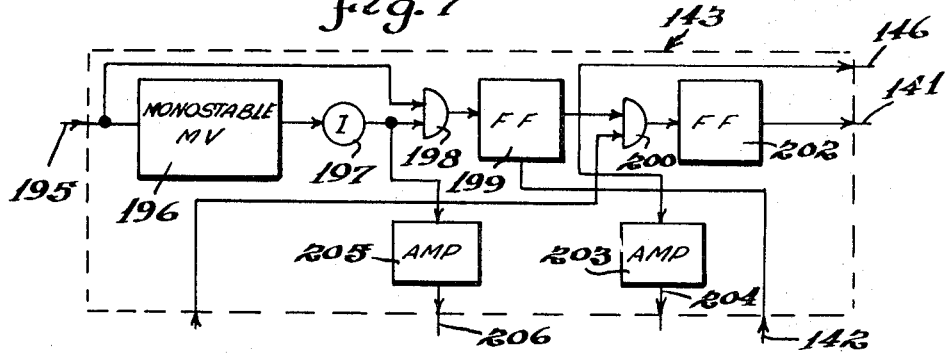
FIG. 7 is a block diagram of a control circuit of the transcriber station.

FIG. 7 is a block diagram of the control circuit 143 to which an input signal is applied on a line 195 from the integrator 144. When the input signal swings positive to a certain degree, a monostable multivibrator 196 is triggered and after a certain delay, 15 milliseconds for example, an output signal is applied through an inverter 197 to one input of a gate 198 having a second input connected to the input line 195. If a signal of sufficient amplitude is then present on the input line 195, a flip-flop 199 is triggered but if not, the flip-flop 199 is not triggered and the circuit is in its initial state. Thus the circuit requires the concurrence of signals of predetermined amplitudes spaced a certain time interval apart and the possibility of having such signals in random noise is very slight, so that the circuit reliably responds only to the development of a data signal envelope.

When flip-flop 199 is triggered, an enabling signal is applied to one input of a gate 200 having a second input connected to a line 201 to which reference pulses are applied from the output of the Schmitt trigger circuit 137. The output of the gate 200 is connected to the input of a flip-flop 202 having an output connected through the line 141 to the gates 124 and 135. Thus the flip-flop 202 is triggered and the gates 124 and 135 are enabled by the first reference pulse following the operation of the flip-flop 199.

The output of the flip-flop 199 is additionally connected through the line 146 to the input of the counter 116 and is also connected to the input of an amplifier 203 having an output connected through a line 204 to the reference counter 134 to reset the reference counter. The flip-flops 199 and 202 are reset by a reset pulse applied on the line 142 from the output of the reference counter 134.

To reset the decade counters 121–123 prior to application of pulses thereto, the output of the inverter 197 is applied through an amplifier 205 to a line 206 connected to reset inputs of the counters 121–123.

Figure 8:
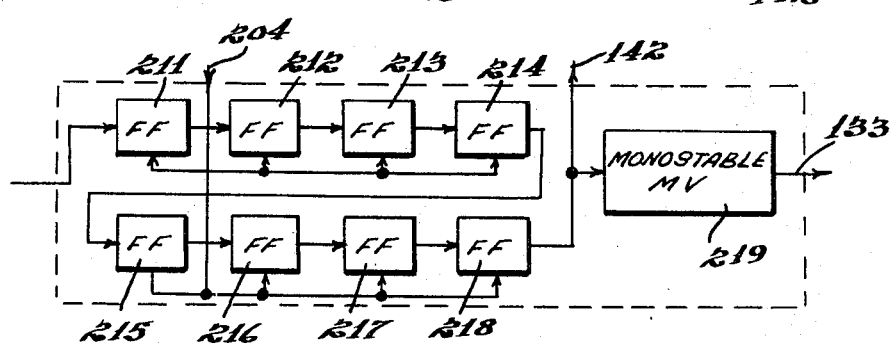
FIG. 8 is a block diagram of a reference counter of the transcriber station.

FIG. 8 is a block diagram of the reference counter circuit 134 which comprises eight flip-flops 211–218 connected in cascade, the last flip-flop 218 being triggered in response to application of 256 pulses to the input flip-flop 211. An output pulse from the last flip-flop 218 is applied to a monostable multivibrator 219 which after a certain delay develops an output signal on the line 133. The output of the last flip-flop 218 is also applied through the line 142 to reset the flip-flops 199 and 202 of the control circuit 143. The reset line 204 is connected to all of the flip-flops 211–218 to insure clearing of the counter prior to application of the reference pulses thereto.

Figure 9:
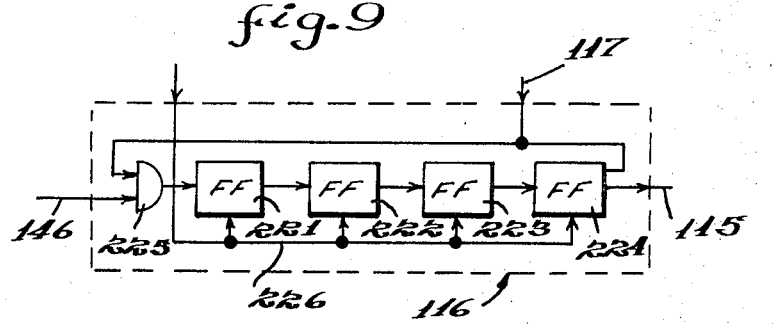
FIG. 9 is a block diagram of a counter of the transcriber station.

FIG. 9 is a block diagram of the counter circuit 116 which comprises four flip-flops 221–224 connected in cascade the input line 146 being connected through a gate 225 to the input of the first flip-flop 221. When the total count exceeds 8, as is the case with a Type II or Type III message, the fourth flip-flop 224 is triggered and a signal is applied therefrom to the gate 225 to close the gate 225. At the same time, a signal is applied through the line 115 to the end of line control circuit 114 and a signal is applied also on the line 117 to the reset circuit 118. All of the flip-flops 221–224 have reset inputs connected to a line 226, connected to the output of the reset circuit 118.

Figure 10:
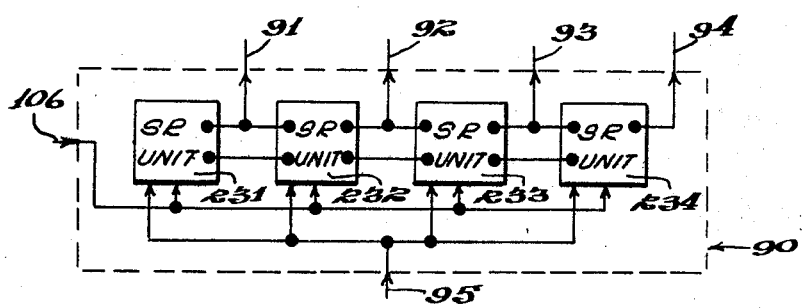
FIG. 10 is a block diagram of a cycling circuit of the transcriber station.

FIG. 10 is a block diagram of the cycling circuit 90 which comprises four shift register units 231–234 having outputs respectively connected to the lines 91–94. An input signal from the end of punch control circuit 104 is applied through the line 106 to progressively change the states of the shift register units. A reset signal is applied to all of the shift register units 231–234 from the line 95. When the reset signal is applied, the counter of 1000 is registered by the units 231–234 and a signal is developed on the line 91. The application of one input pulse on the line 106 then shifts the units to register a count of 0100, a signal being then developed on the line 92. The second input pulse on the line 106 shifts the units to register a count of 0010 to develop a signal on the line 93 and the application of a third input pulse causes a count of 0001 to be registered, with a signal being then developed on the line 94.

Figure 11:
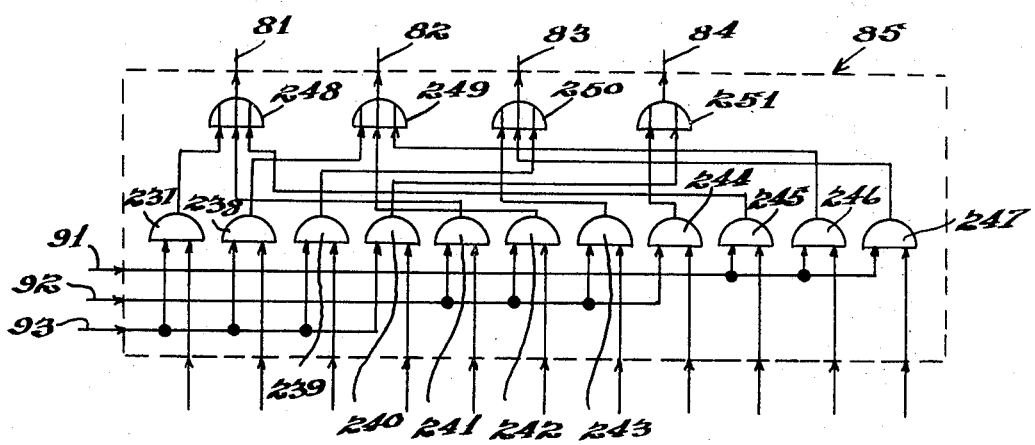
FIG. 11 is a schematic diagram of a gating circuit of the transcriber station.

FIG. 11 is a block diagram of the gating circuit 85 which comprises four AND gates 237–240 having inputs connected to the four output lines from the units buffer storage 87 with the other inputs of the gates 237–240 being connected to the line 93. Another group of four AND gates 241–244 have inputs connected to the output lines from the tens buffer storage 88 with the other inputs of the gates 241–244 being connected to the line 92. Three AND gates 245–247 are provided having inputs connected to the output lines from the hundreds buffer storage 89 with the other inputs of the gates 245–247 being connected to the line 91. The outputs of the gates 237, 241 and 245 are connected through an OR gate 248 to the input line 91 of the "1" driver 73, the outputs of the gates 238, 242 and 246 are connected through an OR gate 249 to the line 82, the outputs of the gates 239, 243 and 247 are connected through an OR gate 250 to the line 83, and the outputs of the gates 240 and 244 are connected through an OR gate 251 to the line 84.

SEQUENCE OF OPERATION

The field station 11 operates to record Type I messages at four minute intervals. In recording such a message, the time generator 49 initially supplies signals on the lines 55 and 56 to energize the motor and clutch of the recorder 38. Thereafter, at a time $t_0$, as illustrated in FIG. 4, a blanking signal is removed from the line 54 to cause operation of the reference voltage-controlled oscillator 52 and to record on one track of the magnetic tape a pulse signal having a frequency of approximately 1164 cycles per second, for example, and having an envelope of a form as indicated by reference numeral 63 in FIG. 4.

Thereafter, at a time $t_1$, the control circuit 46 removes a blanking signals from the signal voltage-controlled oscillator 37 while the input of the voltage-controlled oscillator 37 is connected through the stepping switch 36 to the output of the differential pressure potentiometer 21. A data frequency burst is then recorded on the magnetic tape having an envelope as indicated by reference numeral 65 in FIG. 4. This burst continues until a time $t_2$, when a blanking signal is again applied on the line 53. The data frequency burst may, for example, have a duration of 280 milliseconds and a frequency on the order of from 453 to 1818 cycles per second, depending upon the voltage developed by the differential pressure potentiometer 21.

Thereafter, similar frequency bursts 66, 67, 68 and 69 are generated at frequencies corersponding to the voltages developed by the static pressure potentiometer 23, the differential pressure potentiometer 22, the static pressure potentiometer 24 and the temperature potentiometer 30. At a time $t_{11}$ following the end of the last data burst 69, the control circuit 46 again applies a blanking signal to the reference voltage-controlled oscillator 52 and thereafter the time generator 49 removes signals from the lines 55 and 56 to deenergize the motor and clutch of the tape recorder 38.

The Type II and Type III messages are generated in the same way, except in having longer durations and more data bursts corresponding to the additional types of information.

When the recorded signals 63 and 65–69 are reproduced, they have the same form as the recorded signals and the operation of the transcriber may also be considered with reference to FIG. 4. In particular, when the reproduced data burst signal 65 is applied through the data amplifier 128 to the integrator 144, an envelope signal is developed which is applied to the control circuit 143. The leading edge of the envelope signal triggers the monostable multivibrator 196 which develops an output pulse having a wave form as indicated by reference numeral 261 in FIG. 4, with a duration of 15 milliseconds for example. At the end of the pulse 261, a signal is applied to the gate 198 and if the data signal envelope is then present, the flip-flop 199 is triggered to enable the gate 200 which thereafter applies the first reference pulse to the flip-flop 202 to trigger the flip-flop 202 and to generate a signal having a wave form as indicated by reference numeral 262 in FIG. 4.

The flip-flop 202 enables the gates 124 and 135, to apply data pulses to the first decade counter 121 and to apply reference pulses to the reference counter 134. After 256 pulses, the reference counter 134 applies a reset pulse through line 142 to the flip-flops 199 and 202, to define the end of the wave form 262. At that time, or after a short delay, a signal is applied through circuits 132 and 131 to the transfer gating circuit 120 to transfer the binary coded decimal information from the decade counters 121–123 to the units, tens and hundreds buffer storage units 87–89, and to also apply a signal on line 95 to the cycling circuit 90.

The cycling circuit 90 is then placed in a reset condition, and the line 91 is energized to enable certain gates of the gating circuit 85.

The signal on line 95 is also applied through the gate 96 to the delay circuit 97 and after a certain delay, a signal is applied to the drivers 73–77 to cause operation of the tape punch 61 in accordance with the information in the hundreds buffer storage 89.

The form of the signal applied on line 95 is indicated by wave form 263 in FIG. 4, and the wave form at the line 91 is indicated by reference numeral 264 in FIG. 4.

Following operation of the tape punch 61, a signal is applied on line 103 to the end of punch shift circuit 104 which applies a signal on the line 106 to the cycling circuit 90. The line 91 is then deenergized, and the line 92 is energized, the form of signal on the line 92 being indicated by reference numeral 265 in FIG. 4.

Certain gates of the gating circuit 85 are then enabled and the drivers 73–77 are again energized to cause operation of the tape punch in accordance with information in the tens buffer storage 88.

After operation of the tape punch 61, another signal is applied through line 103 to the end of punch shift circuit 104 which applies another signal on line 106 to the cycling circuit 90, a signal being then developed on the line 93 having a wave form as indicated by reference numeral 266 in FIG. 4.

Certain gates of the gating circuit 85 are then enabled and the drivers 73–77 are again energized to operate the tape punch 61 in accordance with information in the units buffer storage 87.

After completion of the punching operation, a signal is again applied through line 103 to the end of punch shift circuit 104 which applies a shift signal through line 106 to the cycling circuit 90. A signal is then developed on the line 94, having a wave form as indicated by reference numeral 267 in FIG. 4.

In the meantime, during the tape punching operation, the leading edge of a data signal envelope signal may again initiate operation of the data counters 121–123 and the reference counter 134 in the manner as described above, and when the reference counter 134 completes its count of 256, a signal is thereafter developed on the line 95 to reset the cycling circuit 90 and to cause another sequence of operation of the drivers 73–77 in accordance with the information in the second data frequency burst 66.

In a similar way, the tape punch is operated in accordance with information contained in the data frequency bursts 67, 68 and 69.

If no reference signal envelope is present on the line 110 when the cycling circuit 90 is placed in its final condition with the line 94 energized, a signal is applied through line 112 to the flag driver, to thereby energize certain punches of the tape punch 61. If at the same time, the counter 116 indicates that eight or more data frequency bursts were included in the message, the end of line driver 72 is energized through the control circuit 114.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. In a data transcribing system,
means for developing a data burst signal having a frequency corresponding to the value of a variable,
means operative during said burst signal for developing a control signal having a fixed frequency,
first counter means for counting the number of pulses of said data burst signal,
second counter means for counting the number of pulses of said control signal, and
means for controlling the operation of said first counter means in response to a measured count of said second counter means,
said control signal having a substantially high rate of repetition during the period of operation of said second counter whereby a substantially large number of pulses are counted by said second counter, and whereby an output signal may be developed from said first counter means which is independent of the speed of movement of the tape during recording and playback thereof.

2. In a data transcribing system,
a continuously driven magnetic tape,
means for developing a data burst signal on said magnetic tape having a frequency corresponding to the value of a variable,
means for substantially simultaneously developing a reference signal on said tape and having a fixed frequency,
first counter means for counting the number of pulses of said data burst signal,
second counter means for counting the number of pulses of said reference signal,
control means for applying a blanking signal to the second counter,
said control means being actuated by the output of said second counter, and
said first counter being deactuated by a measured substantially high count of said second counter whereby an output signal may be developed from said first counter which is independent of the speed of movement of the magnetic tape.

3. In a data transcribing system,
a continuously driven magnetic tape,
means for developing a reference signal on said tape having a fixed frequency,
blanking signal means for deactuating said reference signal means,
time generating means for sequentially deactivating said blanking signal and sequentially causing said reference signal to be applied to said tape,
means for developing a data burst signal on said magnetic tape having a frequency corresponding to the instantaneous value of a variable and being applied simultaneously with said reference signal,
reference counter means for counting the number of pulses of the reference signal and for activating said blanking signal means upon counting a specified number of pulses,
said reference signal having a repetition rate which is substantially high relative to the duration of operation of said reference counter,
data counter means for counting the number of pulses of said data burst, and
said data counter means being deactivated by said blanking signal means.

References Cited

UNITED STATES PATENTS

| | | | |
|---|---|---|---|
| 2,807,797 | 9/1957 | Shoemaker | 179—100.2 |
| 3,158,845 | 11/1964 | Bengston | 340—174.1 |
| 3,253,237 | 5/1966 | Runyan | 179—100.2 |
| 3,412,385 | 11/1968 | Wang et al. | 340—174.1 |
| 3,007,149 | 10/1961 | Brown | 340—347 |

JAMES W. MOFFITT, Primary Examiner

V. P. CANNEY, Assistant Examiner